(12) United States Patent  
Yang

(10) Patent No.: US 7,140,509 B2  
(45) Date of Patent: Nov. 28, 2006

(54) STOP VALVE OF A WATER BAG SUCTION HOSE

(76) Inventor: Shih-Sheng Yang, P.O. Box 82-144, Taipei (TW)

( * ) Notice: Subject to any disclaimer, the term of this patent is extended or adjusted under 35 U.S.C. 154(b) by 677 days.

(21) Appl. No.: 10/231,009

(22) Filed: Aug. 30, 2002

(65) Prior Publication Data

US 2005/0258382 A1  Nov. 24, 2005

(51) Int. Cl.
  A47G 19/22 (2006.01)
  B47D 3/00 (2006.01)
  B47D 5/06 (2006.01)
(52) U.S. Cl. .............. 220/709; 215/229; 222/258; 251/9; 251/10
(58) Field of Classification Search ............ 251/7, 251/9, 10; 222/528, 214, 529, 530, 524; 220/252; 215/229, 7, 9, 10
See application file for complete search history.

(56) References Cited

U.S. PATENT DOCUMENTS

| | | | | |
|---|---|---|---|---|
| 2,869,816 A | * | 1/1959 | Olander | 251/6 |
| 3,034,504 A | * | 5/1962 | Winsor et al. | 604/254 |
| 4,077,601 A | * | 3/1978 | Dick | 251/9 |
| 5,259,538 A | * | 11/1993 | Tardif | 222/528 |
| 5,273,172 A | * | 12/1993 | Rossbach et al. | 215/229 |
| 5,582,320 A | * | 12/1996 | Lin | 220/708 |
| 5,897,013 A | * | 4/1999 | Manganiello | 220/252 |
| 6,050,433 A | * | 4/2000 | Russell et al. | 215/229 |
| 6,523,711 B1 | * | 2/2003 | Hughes et al. | 220/709 |

* cited by examiner

Primary Examiner—Kevin Shaver
Assistant Examiner—Stephanie E. Tyler
(74) Attorney, Agent, or Firm—Leong C. Lei

(57) ABSTRACT

A suction hose stop valve of a water bag comprised a holder having a central passage, a swivel cap and a suction hose penetrating through the central passage; a retaining member each on both sides of the central hole; a locking bolt each in front and rear of the holder, a hole in the swivel cap to admit penetration of the suction hose for delivery the water, a press tab on each side of the hole in the swivel cap; a locking trough at lower edge of the press tab to engage the retaining member to bend the suction hose to prevent delivery of water.

3 Claims, 5 Drawing Sheets

STOP VALVE OF A WATER BAG SUCTION HOSE

BACKGROUND OF THE INVENTION (a) Field of the Invention

The present invention is related to a suction hose adapted with a stop valve of a water bag, and more particularly, to one that is capable of effectively stopping the water from being delivered.

(b) Description of the Prior Art

For a cyclist or a fun rider on road, he has to spare one hand to fetch the water bottle whenever he feels thirsty. However, it may be awkward and risky since usually he needs both hands on the handle and both feet on the pedals to control the bike.

To improve, a prior art of No. 404195 cited from the Gazette with the title of Sucker for Sport Water Bag" comprised of a hollow sucker and its holder. Wherein, the sucker is provided with a penetrating circular hole and an arc nipple at its top, a symmetrical locking tenon is provided at where appropriately on the circumference of the lower end of the sucker; a circular hole in proper depth is provided in an inner shaft inside the holder, and a guide post extending upward from the bottom at the center of the circular hole while a fishing hook is provided on the circumference to an outer shaft of the holder. A circular trough is provided between the inner shaft and the outer shaft with a symmetrical opening provided at the bottom of the inner shaft. When assembled to deliver the water, the sucker is pulled out in straight line. However, an external guide hose connected to the water bag relates to a soft hose that prevents the volume of the sucker from getting too large and it is not easy for the cyclist or the rider to operate to separate the sucker from the holder using a single hand. It in fact requires both hands to operate and that makes the water bag fails to meet its purpose for the cyclist or the rider.

SUMMARY OF THE INVENTION

The primary purpose of the present invention is to provide a suction hose stop valve for a water bag by control of a swivel cap to straight up the suction hose to delivery water, or to bend the suction hose to prevent the delivery of water.

To achieve the purpose, the present invention is comprised of a holder, a swivel cap and a suction hose; a central passage in the holder to admit penetration of the suction hose, a retaining member on the side of the central passage and a locking bolt protruding from the outer side of the holder; a hole in the center of the swivel cap to admit penetration of and expose the suction hose; a press tab protruding from the side edge of the hole, and a locking trough on the lower edge of the swivel cap; one locking ring each on both sides below the swivel cap to respectively engage the locking bolt; and the suction hose is straighten up to delivery the water or bent to prevent the delivery by rotating the swivel cap.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
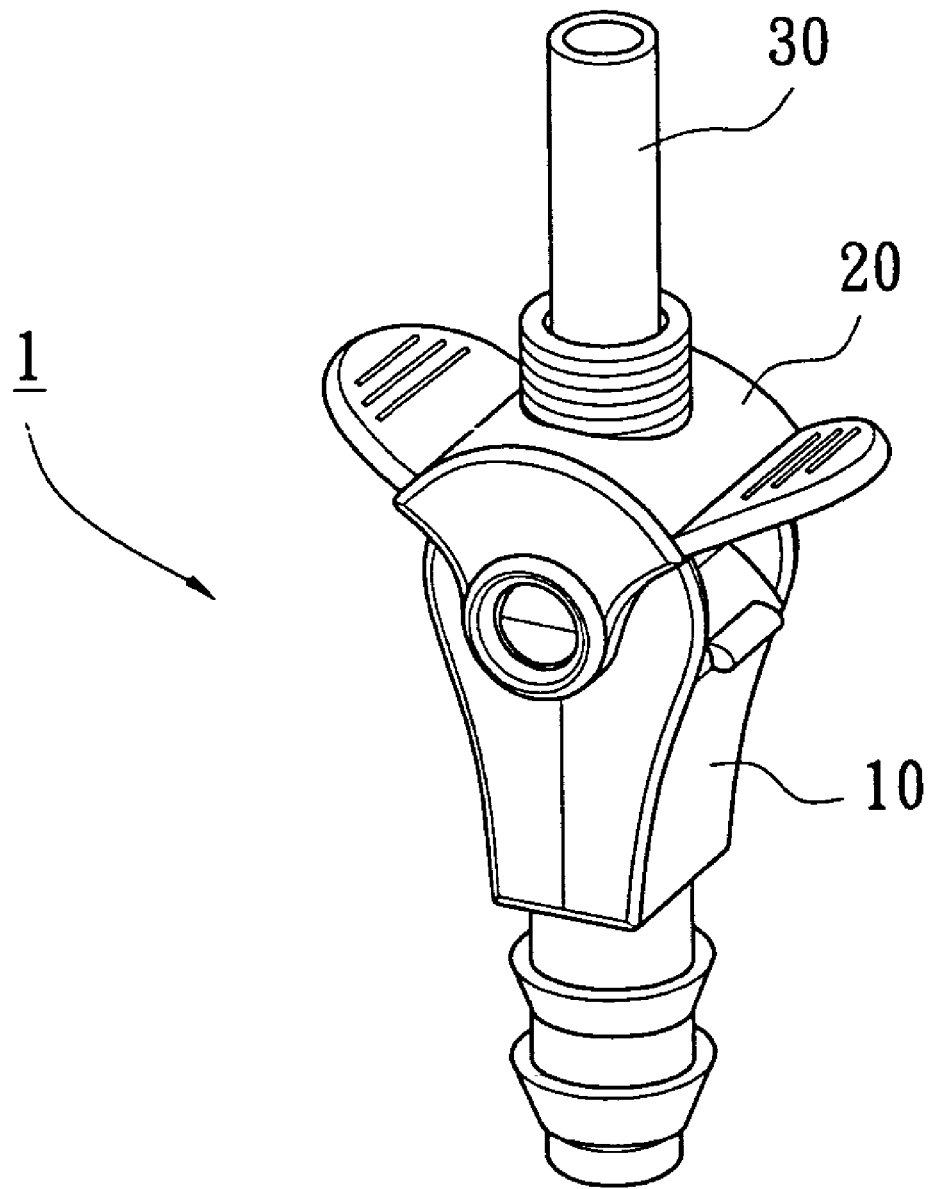
FIG. 1 is a perspective view of a preferred embodiment of the present invention.
Figure 2:
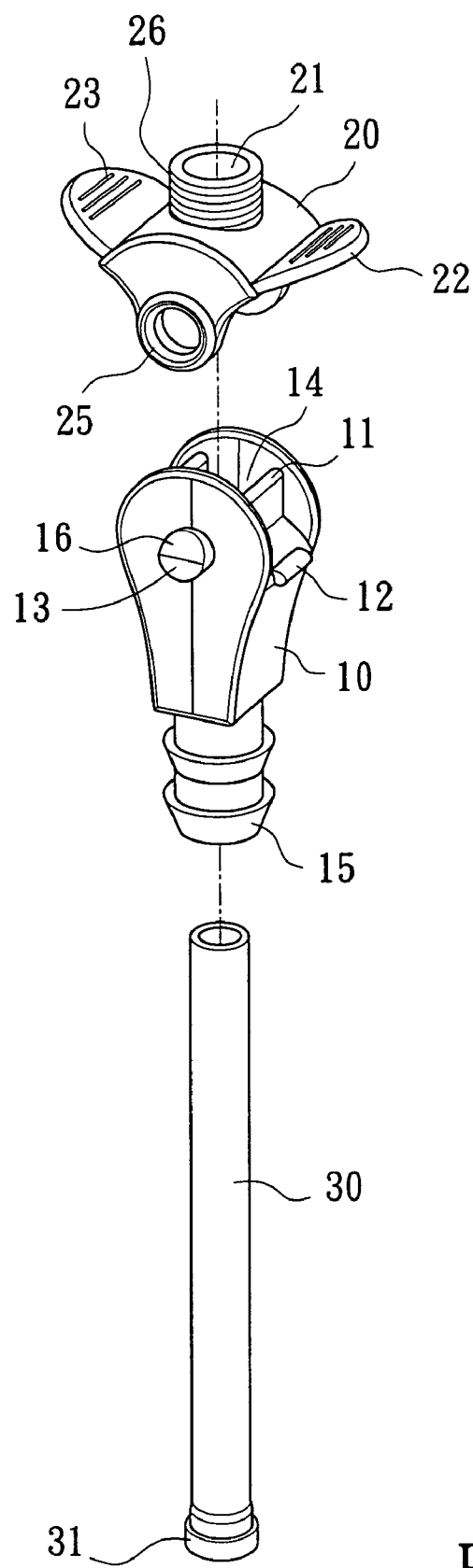
FIG. 2 is an exploded view of the preferred embodiment of the present invention.

Referring to FIGS. 1 and 2, a preferred embodiment of a water bag suction hose stop valve 1 of the present invention is comprised of a holder 10, a swivel cap 20 and a suction hose 30. Two press tabs 11 are each provided on both sides of the holder 10, and a central passage 14 is defined between both press tabs 11; two retaining members 12 are respectively protruding from the right and the left ends of the peripheral of the holder 10, and two locking bolts 13 are protruding from the front and rear of the peripheral of the holder 10 while a section of tube with a slip flange 15 is provided at the lower edge of the central passage 14, and a slope 16 is formed on the upper end of both locking bolts 13.

The swivel cap 20 is provided by compromising the holder 10 and is generally indicating a hollow fan section to accommodate the upper end of the holder 10; a hole 21 is provided in the center of the swivel cap 20, a section of threaded tube 26 extends from the upper peripheral of the central hole 21 and a press tab 22 is each provided on the left and the right ends of the fan section of the swivel cap 20; a locking trough is each provided below the left and the right ends at the bottom of the swivel cap, a rough area 23 is separately provided on each press tab 22 while a locking ring 25 is each provided at the lower end of the fan section of the swivel cap, and a positioning tab 27 is each protruding from both sides of the bottom of the central hole 21.

The threaded tube 26 extending from the upper peripheral of the central hole 21 may be made in the form of a bold tube to be inserted with a flexible sucker. Said suction hose 30 may be made of a flexible, resilient member having one end provided with a flange 31.

Figure 3:
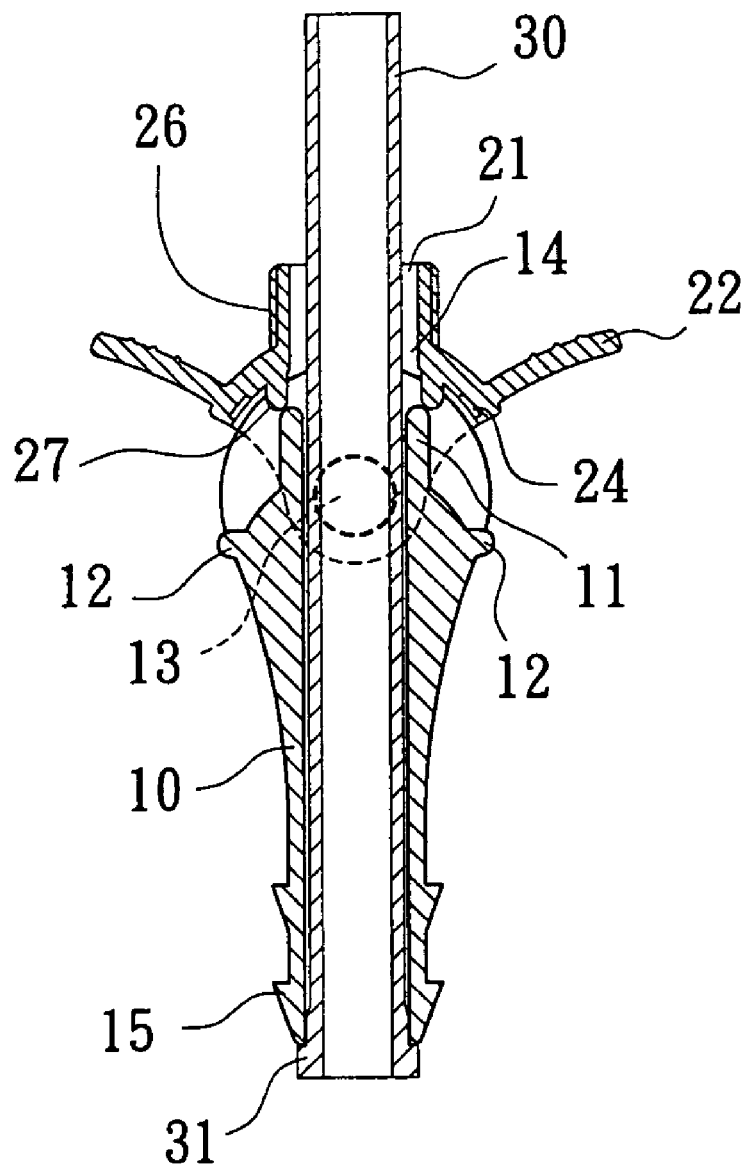
FIG. 3 is a sectional view of the preferred embodiment of the present invention when the water is delivered.

When assembled, the suction hose 30 penetrates the central passage 14 of the holder 10 with the flange 31 of the suction hose 30 holding against the slip flange 15 external to the central passage 14. Whereas the diameter of the suction hose 30 corresponds to that of the inner diameter of the central passage 14 and the suction hose 30 is flexible, the suction hose 30 is retained by the slip flange 15 without falling out of position. The suction hose 30 then penetrates through the central hole 21 in the swivel cap 20 with two locking rings 25 provided on the lower end of the fan section on both sides of the swivel cap 20 to slide into by the respectively slop 16 and engages with said two locking bolts 13 from the holder 10 for the exposed end of the suction hose 30 available to deliver the water from the water bag as illustrated in FIGS. 1 and 3.

Figure 4:
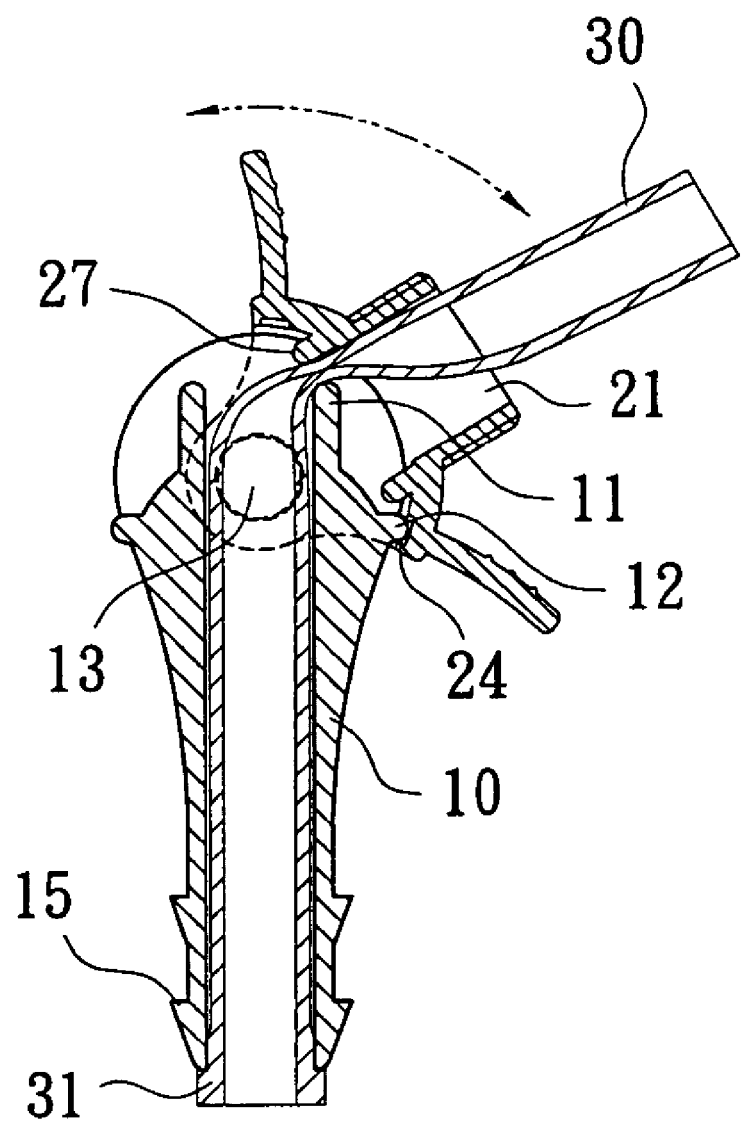
FIG. 4 is a sectional view of the preferred embodiment of the present invention when the delivery of water is prevented.

Now referring to FIG. 4, to prevent water leakage in normal status, either LH or RH press tab 22 of the swivel cap 20 is pressed where the rough area 23 is provided on the press tab 22 for easy press. When pressed, the locking trough 24 protruding from where below the press tab 22 is engaged with the retaining member 12 protruding from the holder 10. Meanwhile, the positioning tab 27 protruding from the bottom of the central hole 21 of the swivel cap 20 holds against the press tab 11 of the holder 10 so that the suction hose 30 is simultaneously compressed to bend by the positioning tab 27 and the press tab 11 to prevent the delivery of the water.

Figure 5:
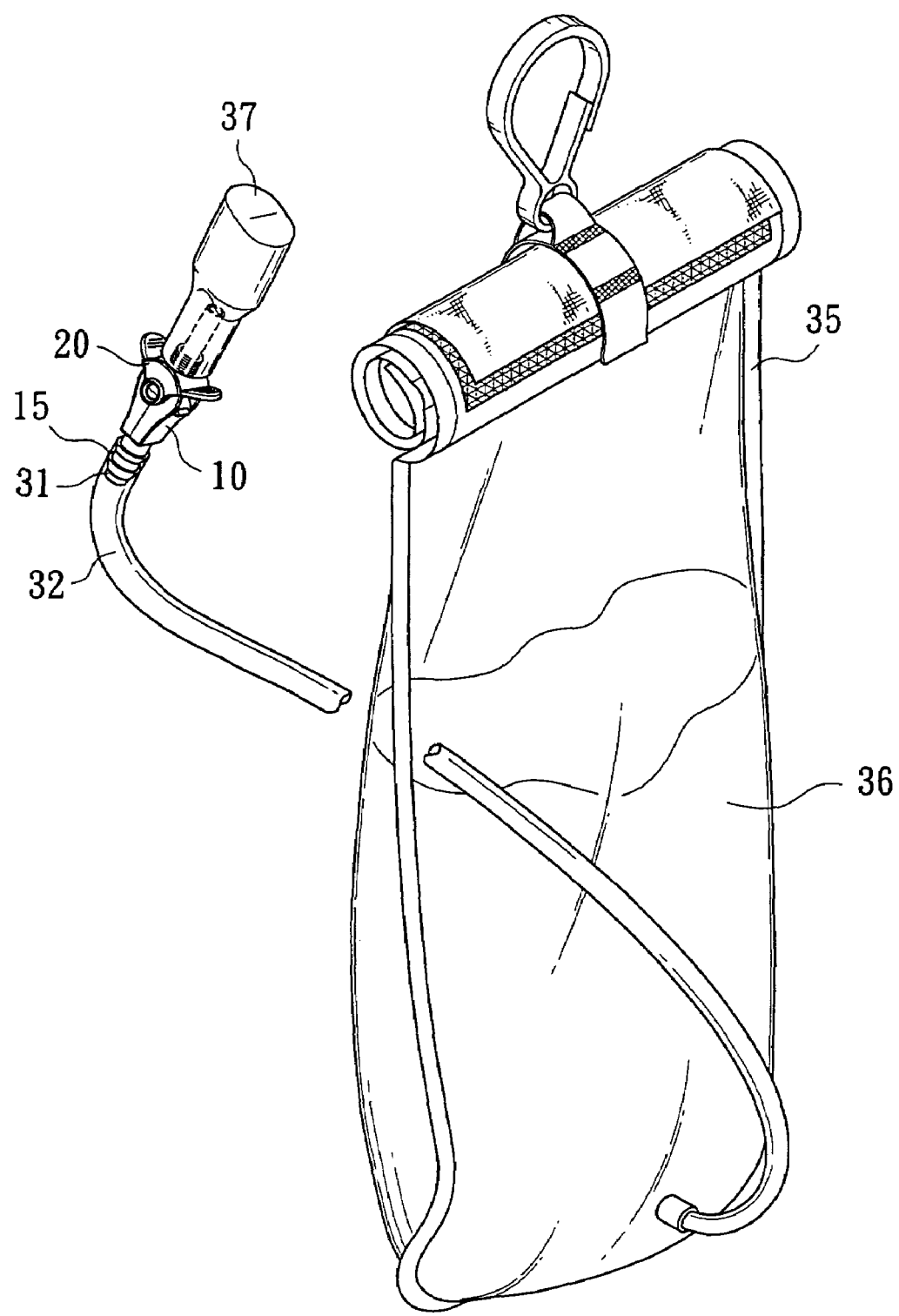
FIG. 5 is a schematic view showing the preferred embodiment is adapted to a sports water bag.

As illustrated in FIG. 5, the preferred embodiment of the present invention is incorporated with a water guide hose 32 extending from a sport water bag. The swivel cap 20 is locked up mutually with the holder 10 by rotating the swivel cap 20 to prevent the liquid inside the water bag 35 to overflow through the water guide hose. A sucker 37 is engaged with the threaded tube 26 extending from the swivel cap 20 for a user, e.g., the cyclist, may sip the liquid 36 in the water bag 35 through the sucker 37. Once a slit of water outlet provided in the front end of the sucker is not bitten or sucked, the pressure is released to close up the slit. However, the subsequent pressure rising from where within the water bag may still force the liquid 36 inside the water bag 35 to seep through the slit in the sucker 37. Therefore, the stop valve 1 of the present invention is adapted to where between the sucker 37 and the water bag 35 to prevent the liquid 36 in the water bag 35 to seep through the slit of the sucker.

As disclosed, a structure of stop valve of the present invention provides the following advantages:

1. The suction hose is made straight up or bent by operating the swivel cap to delivery the water or to stop the delivery of water as desired.

2. Only a few members are required for the assembly, the assembly is easy and convenient and the operation of control the delivery water is done simply by rotating the swivel cap.

3. The present invention allows the adaptation of a soft sucker to offer a summary way of preventing overflow of the water by pressing the swivel cap to provide a self-locking stop valve.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A suction hose stop valve of a water bag comprising:
   a holder, containing at least one press tab, a central passage in the peripheral of the press tab to admit penetration of a flexible suction hose, at least one retaining member and a locking bolt being provided on an outer edge of the central passage;
   a hollow swivel cap, a hole being provided in a center of the swivel cap to allow exposure of the suction hose, a press tab protruding from one end of the swivel cap, and a locking tough being provided at a lower edge of the press tab, the locking trough at the lower edge of the swivel cap when pressed engaging the retaining member to force the suction hose to be bent thereby preventing delivery of water;
   wherein a press tab is each provided on both sides of the central passage inside the holder while two retaining members and two locking bolts are provided on an outer edge of the holder, a section of tube extends from an upper peripheral of the hole in the swivel cap to be inserted with a flexible sucker, a section of threaded tube extends from the upper peripheral of the hole in the swivel cap to engage to a sucker.

2. A suction hose stop valve of a water bag as claimed in claim 1, wherein, a slip rough area is provided on both press tabs protruding from both of the right and the left ends of the swivel cap.

3. A suction hose stop valve of a water bag as claimed in claim 1, wherein, a slope is formed on the upper end of the locking bolt on the holder.

* * * * *